United States Patent [19]
Stanford et al.

[11] 3,728,419
[45] Apr. 17, 1973

[54] PHOSPHATED MIXED ESTERS OF HYDROXY AMINES

[75] Inventors: James R. Stanford, Sugarland; Paul G. Vogelsang, Jr., Houston, both of Tex.

[73] Assignee: Nalco Chemical Company, Chicago, Ill.

[22] Filed: Feb. 3, 1970

[21] Appl. No.: 8,436

Related U.S. Application Data

[62] Division of Ser. No. 682,618, Nov. 13, 1967, Pat. No. 3,557,001.

[52] U.S. Cl.................260/928, 210/58, 252/8.55 B, 252/80, 252/175, 260/945, 260/978, 260/980
[51] Int. Cl..........................C07f 9/08, C02b 3/06
[58] Field of Search..................260/928, 980, 978

[56] References Cited

UNITED STATES PATENTS 3,380,927  4/1968  Edelstein et al. ..................260/928 X

*Primary Examiner*—Lewis Gotts
*Assistant Examiner*—Anton H. Sutto
*Attorney*—Johnston, Root, O'Keeffe, Keil, Thompson and Shurtleff

[57] ABSTRACT

Phosphate mixed esters of hydroxy amines containing less than eight carbon atoms in hydrocarbon groups attached to the amino nitrogen and hydroxy hydrocarbons containing at least six carbon atoms in a hydrocarbon group thereof are prepared and used as scale inhibitors.

7 Claims, No Drawings

PHOSPHATED MIXED ESTERS OF HYDROXY AMINES

This application is a division of U.S. application Ser. No. 682,618, filed Nov. 13, 1967 which has now matured into U.S. Pat. No. 3,557,001.

The preferred compositions of the invention are phosphate mixed esters of: (A) hydroxy amines containing less than eight carbon atoms in hydrocarbon groups attached to one or more amino nitrogens, and (B) oxyalkylated monohydroxy surface active compounds, e.g., oxyethylated nonylphenol, oxyethylated tridecyl alcohol, and oxyethylated normal alcohol mixtures containing six or more carbon atoms.

The hydroxy amines and the hydroxy hydrocarbons are phosphated by reaction with polyphosphoric acid or phosphorus pentoxide at elevated temperature, preferably in the order of about 50° to 175°C. The reaction time is preferably at least about 30 minutes. The reaction may be conducted longer, however, e.g., up to 3 to 5 hours, to assure complete reaction. If desired, a catalyst such as $BF_3$ etherate complex may be used. When using polyphosphoric acid, the hydroxy amine and the hydroxy hydrocarbon can be added to the polyphosphoric acid liquid. Conversely, the polyphosphoric acid can be added to a mixture of the hydroxy amine and the hydroxy hydrocarbon.

The resultant reaction product may be used as is, or it may be converted to a salt by partial to complete neutralization with an alkaline substance such as, for example, potassium or sodium hydroxide, potassium or sodium carbonate, ammonia, or a basic amino compound, e.g., tetramethyl ammonium hydroxide, methylamine, ethylamine, diethylamine, triethanolamine, diethanolamine, triethylamine, ethylene diamine, diethylene triamine, pyridine, morpholine or other amine. The amine should preferably be a water soluble amine or at least one that does not destroy solubility in water.

The hydroxy amines can be relatively simple amines, such as, diethanolamine or triethanolamine, or they can be more complex, such as, the still residues obtained in the manufacture of triethanolamine or the products obtained by oxyalkylating amines. They can be monoamines or polyamines. They can have a single hydroxy group as in aminoethylethanolamine but preferably have a plurality of hydroxy groups. The oxyalkylated amines are obtained by reacting an alkylene oxide, for example, ethylene oxide or 1,2-propylene oxide, with an amine containing one or more reactive hydrogen atoms. The preferred amines contain at least one 2-hydroxy ethyl group ($-CH_2CH_2OH$) provided by oxyethylation. The primary hydroxyl groups thereof are more effective than the secondary hydroxyl groups which would be provided by oxypropylation

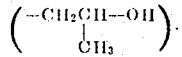

However, oxypropylation may be used if the oxypropylated product is then oxyethylated to provide terminal 2-hydroxyethyl groups. Ethylenediamine, for example, can be oxyethylated with 4 moles of ethylene oxide per mole of diamine to produce a diamine containing four 2-hydroxyethyl groups. By using both ethylene oxide and 1,2-propylene oxide, products can be obtained with both hydroxyethyl and hydroxypropyl groups. The extent of the oxyalkylation can also be increased by increasing the number of moles of alkylene oxide and in some cases, it is desirable to use as many as 30 moles of alkylene oxide per mole of amine. In general, however, this is not necessary for the purpose of the invention. Other amines which can be oxyalkylated to provide hydroxy amines are diethylenetriamine, triethylenetetramine and tetraethylene pentamine. It is normally desirable that the hydroxy group which is to be phosphated should be separated from the nitrogen atom by at least one carbon atom and preferably by at least two carbon atoms as in the 2-hydroxyethyl group. Amines of this general structure are sometimes referred to as hydroxyalkyl amines or alkanolamines. It will be understood that mixtures of hydroxy amines as well as individual amines can be employed in preparing the phosphate esters. Hence, the products can consist of mixed phosphate esters and mixtures of phosphate esters of the hydroxy amines.

The preferred hydroxy hydrocarbons are monohydric surface active agents derived by the oxyethylation of alkyl phenols, e.g., containing four to 12 carbon atoms in the alkyl group or groups, preferably nonyl phenol or dinonyl phenol or mixtures thereof, or primary alcohols containing six to 18 carbon atoms, preferably tridecyl alcohol, or mixed 6–10 carbon atoms alcohols, with 2–20, preferably 4–14 moles of ethylene oxide per mole of such monohydric substance. In general, it is preferable that the monohydric oxyalkylated surface active agent have a terminal 2-hydroxyethyl group provided by oxyethylation. The primary hydroxyl groups are more effective than the secondary hydroxyl groups which would be provided by oxypropylation. However, oxypropylation or oxybutylation can be used if the oxyalkylated product is then oxyethylated to provide terminal 2-hydroxyethyl groups.

The phosphate esters have an average of at least one and up to all of the hydroxyls of the organic portion of the molecule replaced by phosphate ester groups derived from phosphorus pentoxide or polyphosphoric acid, the said phosphate ester groups consisting essentially of one or both of a member selected from the group consisting of

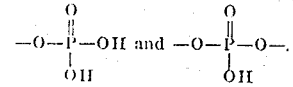

Also, the invention embraces the salts derived by the partial to complete neutralization of the phosphate ester groups.

The invention further embraces a process for preventing hardness scale deposits on metal surfaces in contact with hard water containing hardness scale-forming ions which comprises contacting said metal surfaces with said hard water while maintaining therein a hardness-ion-precipitation-preventing quantity in the order of 0.5–100 parts per million of the previously described mixed esters and salts thereof.

The invention is particularly suitable for scale prevention by natural brines on ferrous metal walls and other surfaces in oil producing and water flood systems. Inorganic polyphosphates have long been the most effective and economical sequestering agents used for the prevention of alkaline deposits in both oil producing and water flood systems. However, due to the problems encountered in feeding inorganic polyphosphates and their incompatibility with many waters, a need for a liquid organic phosphate with good solubility in waters containing hardness ions has become increasingly evident. For this reason, a liquid product with good solubility in produced waters and having the effectiveness and low treating cost of inorganic polyphosphates is needed.

The invention has utility in the prevention of similar scale deposits occurring in closed and once-through cooling systems where hard water is employed.

The compounds may also have utility in boiler feed waters and in waters charged to certain desalinization equipment where scale deposition is a problem.

The invention may also be used in the prevention of scale deposits in certain effluent and disposal waters, particularly wehre other materials used in the prevention of such deposits may constitute a pollution problem.

The invention is especially important in the treatment of wells in what is known as a "squeeze" application. The chemicals of the invention have unique adsorption-desorption properties in that they are adsorbed on solid surfaces and slowly released into the produced water or brine over a period of time to give long term protection caused by scale deposition in the surfaces of the formation face and the producing equipment.

The mixed phosphate esters of the invention are liquid materials with a low freezing point and good solubility in brines. They have advantages over some mixed phosphate esters which have been previously proposed that are derived from polyols and monohydric non-ionic surface active agents.

The invention will be further illustrated but is not limited by the following examples in which the quantities are stated in parts by weight unless otherwise indicated.

EXAMPLE I 100 parts of tetrahydroxyethylethylenediamine were mixed with 200 parts oxyethylated tridecyl alcohol (47.6 percent tridecyl alchohol puls 52.4 percent ethylene oxide) and 30 parts normal propanol. To the resultant mixture 200 parts polyphsophoric acid were added while allowing the temperature of the mixture to increase to 100° to 125°C. The mixture was held in the range of 100°–125°C. for 30 minutes, then cooled below 100°C. Thereafter 200 parts water, 100 parts methanol and 50 parts of 50 percent aqueous caustic soda were added.

EXAMPLE II 300 parts of a still residue obtained in the manufacture of triethanolamine (Amine N-1) were mixed with 150 parts of the oxyethylated tridecyl alcohol described in Example I and the mixture heated to 50°C. 700 parts of polyphosphoric acid were then added while allowing the temperature of the mixture to increase to 130°–140°C. The reaction mixture was then cooled to below 100°C. and 700 parts water added.

EXAMPLE III 150 parts of a triethanolamine still residue (Amine N-1) were mixed with 150 parts of a mixture of aliphatic alcohols (Alfol 610) containing 20 percent hexanol, 35 percent octanol and the remainder decanol. This mixture was heated to 50°C. and 700 parts polyphosphoric acid were slowly added while allowing the temperature to increase to 130°–140°C. The mixture was held at 130°–140°C. for 30 minutes after the polyphosphoric acid addition was complete. It was then cooled to 95°C. and 500 parts of water and 700 parts of normal propanol were added.

EXAMPLE IV 150 parts of triethanolamine still residue (Amine N-1) were mixed with 150 parts oxyethylated tridecyl alcohol (30.7 percent tridecyl alcohol plus 69.3 percent ethylene oxide) and the mixture heated to 50°C. 500 parts of polyphosphoric acid were slowly added to the mixture while allowing the temperature to increase to 130°–140°C. The mixture was held at 130°–140°C. for 30 minutes after the polyphosphoric acid addition had been completed. It was then cooled to 95°C. and 400 parts of water added.

EXAMPLE V

The procedure was the same as in Example IV except that the polyphosphoric acid was placed in a 3-necked reaction flask provided with agitation and heated to 50°C. Thereafter the heat was discontinued and the mixture of hydroxy amine and oxyethylated tridecyl alcohol heated to 50°C. was added gradually while allowing the temperature to increase to 130°C. The temperature was then held at 130°C. for 30 minutes, the mixture thereafter cooled to 95°C. and 400 parts of water were added.

EXAMPLE VI

The procedure was the same as in Example III except that the mixture of hydroxy amine and Alfol 610 was added to the polyphosphoric acid.

EXAMPLE VII 150 parts of triethanolamine still residue (Amine N-1) were mixed with 150 parts oxyethylated nonyl phenol (32.5 percent nonyl phenol plus 67.5 percent ethylene oxide) and 500 parts polyphosphoric acid were slowly added to the mixture while allowing the temperature to increase to 130°C. The temperature was held at 130°C. for 30 minutes after which the mixture was cooled to 95°C. and 400 parts of water were added.

EXAMPLE VIII 250 parts polyphosphoric acid were heated to 50°C. and a mixture of 75 parts Amine N-1 and 75 parts oxyethylated phenol (55.6 percent nonyl phenol plus 44.4 percent ethylene oxide) was added slowly while allowing the temperature of the reaction mixture to increase to 130°C. The reaction mixture was heated at 130°C. for 30 minutes and then cooled below 100°C. Thereafter 200 parts of water and 50 parts of normal propanol were added.

EXAMPLE IX 500 parts of polyphosphoric acid were heated to 50°C. and a mixture of 30 parts Amine N-1 and 30 parts Alfol 1218 (monohydric mixture containing 62 percent hexadecanol and 35 percent octadecanol was added slowly while allowing the temperature to rise to 130°C. The reaction mixture was held at a temperature of 130°C. for 30 minutes, then cooled to below 100°C. and 150 parts water and 125 parts normal propanol were added.

EXAMPLE X 250 parts polyphosphoric acid were heated to 50°C. and a mixture of 75 parts tetrahydroxyethylethylenediamine and 75 parts oxyethylated tridecyl alcohol (30.7 percent tridecyl alcohol plus 69.3 percent ethylene oxide) was added slowly while allowing the temperature of the mixture to rise to 130°C. The temperature of the reaction mixture was held at 130°C. for 30 minutes. The mixture was then cooled to below 100°C. and 200 parts of water were added.

EXAMPLE XI 250 parts of polyphosphoric acid were heated to 50°C. and a mixture of 75 parts tetrahydroxyethylethylenediamine and 75 parts oxyethylated nonyl phenol (32.5 percent nonyl phenol plus 67.5 percent ethylene oxide) was slowly added while allowing the temperature of the mixture to increase to 130°C. The temperature of the mixture was held at 130°C. for 30 minutes. The mixture was then cooled and 200 parts of water added.

EXAMPLE XII 250 parts polyphosphoric acid were heated to 50°C. and a mixture of 75 parts tetrahydroxyethylethylenediamine and 75 parts oxyethylated nonyl phenol (55.6 percent nonyl phenol plus 44.4 percent ethylene oxide) was added slowly while allowing the reaction temperature to increase to 130°C. The temperature was held at 130°C. for 30 minutes, then cooled and 200 parts water and 25 parts normal propanol were added.

EXAMPLE XIII 250 parts polyphosphoric acid were heated to 50°C. and a mixture of 75 parts tetrahydroxyethylethylenediamine and 75 parts tridecyl alcohol was added slowly while allowing the temperature of of the reaction mass to increase to 130°C. The reaction mixture was held at 130°C. for 30 minutes, then cooled and 200 parts water and 50 parts normal propanol added.

EXAMPLE XIV 250 parts polyphosphoric acid were heated to 50°C. and a mixture of 75 parts triethanolamine still residue (Amine N-1) and 75 parts tridecyl alcohol was added slowly while allowing the reaction temperature to increase to 130°C. The temperature of the mixture was held at 130°C. for 30 minutes. The mixture was then cooled and 200 parts water and 75 parts normal propanol added.

EXAMPLE XV 250 parts polyphosphoric acid were heated to 50°C. and a mixture of 75 parts tetrahydroxyethylethylenediamine and 75 parts Alfol 610 was added slowly while allowing the reaction temperature to increase to 130°C. The temperature of the reaction mixture was held at 130°C. for 30 minutes. The mixture was then allowed to cool and 200 parts water and 75 parts normal propanol added.

EXAMPLE XVI 250 parts polyphosphoric acid were heated to 50°C. and a mixture of 75 parts tetrahydroxyethylethylenediamine and 75 parts Alfol 1218 was added slowly while allowing the temperature of the mixture to increase to 130°C. The temperature of the mixture was held at 130°C. for 30 minutes. The mixture was then cooled and 200 parts water and 50 parts normal propanol were added.

EXAMPLE XVII 200 parts of the product of Example V were mixed with 75 parts water and 100 parts 50 percent aqueous caustic soda.

EXAMPLE XVIII 200 parts of the product of Example V were mixed with 25 parts water and 150 parts of Amine N-1.

EXAMPLE XIX 200 parts of the product of Example V were mixed with 50 parts water and 150 parts Amine C-6.

EXAMPLE XX 250 parts of polyphosphoric acid were heated to 50°C. and a mixture of 75 parts Amine N-1 and 75 parts oxyethylated tridecyl alochol (11.1 percent tridecyl alcohol plus 89.9 percent ethylene oxide) was added slowly while allowing the temperature to increase to 130°C. The temperature was held at 130°C. for 30 minutes. The reaction product was then cooled and 200 parts of water added.

EXAMPLE XXI 250 parts of polyphosphoric acid were heated to 50°C. and a mixture of 75 parts Amine N-1 and 75 parts of oxyethylated nonyl phenol (10.7 percent nonyl phenol plus 89.3 percent ethylene oxide) was added slowly while allowing the reaction temperature to increase to 130°C. After heating at this temperature for 30 minutes, the reaction product was cooled and 200 parts of water added.

EXAMPLE XXII 250 parts of polyphosphoric acid were heated to 50°C. and a mixture of 75 parts tetrahydroxyethylethylenediamine and 75 parts oxyethylated tridecyl alcohol (11.1 percent tridecyl alochol plus 89.9 percent ethylene oxide) was added slowly while allowing the reaction temperature to rise to 130°C. The reaction mixture was held at 130°C. for 30 minutes, then cooled and 200 parts water added.

EXAMPLE XXIII 200 parts polyphosphoric acid were heated to 50°C. and a mixture of 75 parts tetrahydroxyethylethylenediamine and 75 parts oxyethylated nonyl phenol (10.7 percent nonyl phenol plus 89.3 percent ethylene oxide) was added slowly while allowing the reaction temperature to increase to 130°C. The reaction mixture was held at 130°C. for 30 minutes, then cooled and 200 parts of water added.

EXAMPLE XXIV

The procedure was the same as in Example V except that the product was diluted with normal propanol and water. In the resultant product, the polyphosphoric acid constituted 21.4 percent the oxyethylated tridecyl alcohol 6.4 percent, the triethanolamine residue 6.4 percent, water 50.4 percent and normal propanol 15.4 percent. The active component was therefore 34.2 percent.

In the foregoing examples, the phosphation was carried out with 115% polyphosphoric acid. Phosphorus pentoxide or mixtures of polyphosphoric acid and phosphoric acid and phosphorus pentoxide can also be used. However, the reaction is smoother with polyphosphoric acid and is much easier to control.

The compositions of the invention are especially effective in the inhibition of scaling on metal surfaces by calcium sulfate, barium sulfate, and calcium carbonate. They are useful in the oil production industry to prevent deposits of these scale-producing compounds on metal surfaces of pumps, pipes, valves, tanks, and the like, when waters containing the scale-producing compounds (or precursors thereof, e.g., calcium bicarbonate) are treated in the concentrations aforesaid, i.e., 0.5 to 100 parts per million. Places where scale build up is most likely to become troublesome are those in the liquid handling systems wherein there is a change in fluid pressure, a change in fluid temperature, or a change in fluid flow rate.

The invention may be used may be used in waterflood systems used to inject water into subterranean formations, wherein the water is brackish or is a brine conducive to scale formation on metal surfaces of the waterflood system. Typcial brines encountered in waterflood operations, wherein water is drawn from sources available at or near the waterflood site, are:

| | Brine A | Brine B |
|---|---|---|
| Chloride (NaCl) | 49,000 mg/l. | 28,000 mg/l. |
| Total Hardness (CaCO₃) | 5,300 mg/l. | 3,400 mg/l. |
| Calcium (CaCO₃) | 4,900 mg/l. | 1,600 mg/l. |
| Alkalinity P(CaCO₃) | 120 mg/l. | 80 mg/l. |
| Alkalinity M(CaCO₃) | 1,050 mg/l. | 130 mg/l. |
| Sulfate (NaSO₄) | 0 | 4,750 mg/l. |
| pH | 7.8 | 8.3 |

Any of the products previously described can be used to prevent scale formation on metal walls of pipes, pumping equipment and storage tanks used to inject flood waters into subterranean formations. The dosage will vary depending on the particular composition and the type of brine in the formation but, in general, effective control is obtained with 10 to 20 parts per million (ppm) of inhibitor and in some cases as low as 0.5 ppm is effective.

In cooling waters of closed cooling systems, wherein the cooling water is a typical municipal tap water, maintenance of dosage levels of 15–30 ppm are typical, although higher levels up to about 100 ppm may be needed or desired in particular cases.

In low pressure boilers, dosage levels in the range of 50–250 ppm may be employed in the feedwater, a typical level being about 80–100 ppm.

The compositions of the invention are useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formations can be minimized.

In comparative tests using brines made by dissolving 7.5 grams of sodium chloride and 8.33 grams of calcium chloride in distilled water sufficient to make 1 liter (Brine C) and 7.5 grams sodium chloride plus 10.66 grams Na₂SO₄ in distilled water sufficient to make 1 liter (Brine D), it was found that the composition of Example XXIV was partially effective in preventing calcium sulfate deposition at 0.25 ppm and completely effective at 1 ppm when 50 ml of each brine were mixed and heated for 24 hrs., at 160°F. A control test with no additive gave a deposit of 1,800 ppm CaSO₄, calculated as CaCO₃.

The compositions of Example XXIV also prevented barium sulfate precipitation over a period of 20 hours at a temperature of 160°C. using concentrations of said composition of 1–10 ppm in a solution having a barium concentration of 160 mg/l as barium chloride and a sulfate concentration of 1600 mg/l as sodium sulfate.

The composition of Example XXIV was also effective in preventing calcium carbonate depositions on the surface of test cells containing 20 ml of brine (Brine E) made by dissolving 5,180 mg/l sodium bicarbonate, 22,200 mg/l sodium chloride, 6 mg/l sodium sulfate (Na₂SO₄), 366 mg/l magnesium chloride (MgCl₂·6H₂O), and 2,000 mg/l calcium chloride, having a pH of 6.2, saturated with carbon dioxide before use, and heated for 20 hours at 160°C. Complete inhibition of calcium carbonate deposition was obtained at a dosage of 3 ppm. The blank control deposited 1,460 mg/l of calcium carbonate.

In a similar manner, the products of Examples VIII to XIX were evaluated and it was found that all of these products were effective in retaining calcium sulfate in solution in a mixture of 50 ml of Brine C and 50 ml of Brine D at a temperature of 160°F. under static conditions for 24 hours. In these tests the blank, before precipitation, contained 4,800 mg/l of calcium sulfate, as calcium carbonate, and after precipitation 3,000 mg/l of calcium sulfate, as calcium carbonate. The addition of 1 ppm, 2 ppm, 3 ppm, 5 ppm and 10 ppm of each of the compositions of Examples VIII to XIX, respectively, caused the retention of all of the calcium sulfate. The addition of 0.5 ppm caused the retention of all of the calcium sulfate in the case of the products of Examples VIII and XI and a partial retention in the case of the other products.

In another series of tests under similar conditions where the blank or control before precipitation contained 4,900 mg/l of calcium sulfate, as calcium carbonate, and 3,200 mg/l after precipitation, the addition of 1 ppm, 3 ppm, 5 ppm and 10 ppm of each of the products of Examples XX, XXI, XXII and XXIII caused the retention of all of the calcium sulfate. The addition of 0.5 ppm of the product of Example XX caused the retention of 4,600 mg/l of the calcium sulfate, calculated as calcium carbonate, and the addition of 0.5 ppm of the products of Examples XXI, XXII and XXIII caused retention of all of the calcium sulfate.

In a calcium carbonate brine of the type previously described, heated to a temperature of 160°C. under static conditions for 24 hours where the blank control before precipitation contained 1,840 mg/l of calcium carbonate and after precipitation 400 mg/l of calcium carbonate, the addition of as little as 1 ppm of each of the compositions of Examples VIII to XIX produced some retention of the calcium carbonate and the addition of 20 ppm produced complete retention of the calcium carbonate. In the case of Examples XI and XVI, complete retention was obtained at a concentration of 5 ppm.

In a similar test over a period of 20 hours, the compositions of Examples XX to XXIII provided complete retention of the calcium carbonate at 3 ppm concentration. The products of Examples XXI, XXII and XXIII also afforded complete retention at a concentration of 1 ppm.

In the process for making phosphate esters previously described, it will be understood that where a solvent is used the process is carried out at a temperature below the boiling point of the solvent.

The solvents used act as combination solvents and viscosity control agents, although any solvents, e.g., hydroxyacetic acid, having a reactive hydroxyl group will react in the phosphation and influence the overall composition of the final product.

In a number of oil fields in West Texas and other areas, water floods have been established in which waters incompatible with the connate waters were used for injection. This occurs when a good source of compatible water is not available. Most of these floods are using a high sulfate water to flood a formation which has a high calcium content water. As the waters reach the producing well they mix, and a calcium sulfate deposition occurs, either in the formation at the well bore or in the producing equipment. This requires the removal of the tubing, rods and pump for cleaning, and a fracturing job if the formation is plugged, which is the case most of the time. By the practice of the present invention the formation of scale in the producing equipment and underground formation can be reduced or prevented. However, as the scale forms in the producing formation, the scale control chemical must be squeezed into the producing underground formation so it can be produced back slowly in one of the waters before they mix. To give long term scale inhibttion the chemical must be adsorbed on the underground formation in such a manner that it is slowly released into the water as it passes over the formation so that a chemical concentration of 1 to 10,000 ppm is always in the water. Some scale control compounds when squeezed into the formation are so tightly absorbed that little, if any, feedback occurs, while others are essentially not adsorbed and feedback occurs immediately with no extended protection given.

In a typical application, five to ten barrels of water from a producing oil well are pumped into an oil well. A chemical composition as herein described is then injected into the well and displaced or "squeezed" through the underground oil-bearing formation by pumping 50 to 150 barrels of produced water into the well, depending upon the amount of water being produced. The produced oil and water are then pumped from the well.

Similarly, the invention is applicable to the treatment of water supply wells. The pre-addition of water to the well can be omitted. The phosphate mixed esters or mixture of esters can also be added directly to the input well of a waterflood system consisting of one or more input wells and one or more producing wells.

As previously indicated, the chemical compositions prepared as herein described are especially valuable because of their adsorption-desorption properties which makes it possible to be adsorbed on solid surfaces and slowly released into the produced water or being over a period of time to give long term protection against scale deposition.

In practicing the invention it will be understood that a number of modifications can be made in the preparation of the phosphate esters. The esterification process can be carried out with or without the addition of a solvent. Examples of solvents are isopropanol, n-propanol, dioxane and toluene. If a solvent is used, the process is normally carried out at temperatures below the boiling point of the solvent.

In the description it will be understood that the term "hydroxy hydrocarbon" is intended to cover hydrocarbons where the hydroxyl group is attached directly to a carbon group of at least six carbon atoms, as well as oxyalkylated derivatives thereof wherein the hydroxyl group is connected to a carbon chain which in turn is connected through oxygen to a hydrocarbon group. In the latter event, the oxyalkylated material can contain a plurality of ether oxygen atoms, dpending upon the degree of oxyalkylation.

An important feature resides in the fact that the compositions of the invention are effective in inhibiting the precipitation of hardness components of water, such as calcium, when such compositions are used in what is commonly referred to as threshold amounts, i.e., usually 1 to 3 parts per million and not more than 9 parts per million. These amounts are far less than normally required to sequester or chelate the calcium.

Another important feature is the stability of the compositions against hydrolytic action at high temperatures. For example, they can be used to inhibit scale formation in water or brines at 200°–300°F. where inorganic polyphosphates are relatively unstable. They can also be used under conditions where much higher temperatures are employed, for instance, in water or brines which are heated by submerged combustion.

In addition, the compositions of the invention can act as corrosion inhibitors in corrosive waters and brines.

The compounds which are described by trade name have the following compositions:

1. Amine N–1 is an amine residue obtained in the production of triethanolamine.

2. Amine C–6, obtained as a co-product from a commercial continuous operation, is a clear, dark-amber liquid composed primarily of a mixture of aliphatic and heterocyclic mono- and diamines. The morpholinyl ring is the dominant heterocyclic group present, and the oxyethylene linkage appears very frequently in the various compounds present. Amine C–6 is completely miscible with water. The principal components of Amine C–6 are 4-(2-aminoethoxy) ethyl morpholine, 2-(4-morpholinylethoxy) ethanol and bis-2-(4-morpholinyl) ethyl ether.

The invention is hereby claimed as follows:

1. A phosphate mixed ester obtained by the reaction of a compound from the group consisting of polyphosphoric acid and phosphorus pentoxide with at least one hydroxy amine and at least one hydroxy hydrocarbon at temperatures from about 50° to 175°C. in proportions and for a period of time such that hydroxyl groups of both said hydroxy amines and said hydroxy hydrocarbons are replaced by phosphate ester groups, said phosphate ester groups consisting essentially of one or both of a member selected from the group consisting of

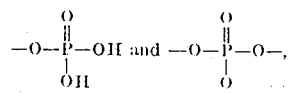

said hydroxy amine being from the group consisting of tetrahydroxyethylethylene diamine and triethanolamine still residues and said hydroxy hydrocarbons being from the group consisting of oxyethylated monohydric alkyl phenols containing four to 12 carbon atoms in the alkyl group or groups and oxyethylated monohydric alkyl alcohols containing six to 18 carbon atoms, said oxyethylated alkyl phenols and said oxyethylated alkyl alcohols containing 2 to 20 moles of ethylene oxide per mole thereof, the weight ratio of said hydroxy amine to said hydroxy hydrocarbon being within the range of 1:2 to 2:1.

2. A water soluble salt derived by the partial to complete neutralization of said phosphate ester groups of a composition as claimed in claim 1.

3. A phosphate mixed ester as claimed in claim 1 wherein said hydroxyamine is a triethanolamine still residue.

4. A phosphate mixed ester as claimed in claim 1 wherein said hydroxyamine is tetrahydroxyethylethylenediamine.

5. A phosphate mixed ester as claimed in claim 1 wherein said hydroxy hydrocarbon is an oxyethylated alkyl phenol containing 4–12 carbon atoms in an alkyl group oxyethylated with about 2–20 moles of ethylene oxide per mole of said alkyl phenol.

6. A phosphate mixed ester as claimed in claim 1 wherein said hydroxy hydrocarbon is derived by oxyethylation of tridecyl alcohol with about 2–20 moles of ethylene oxide per mole of tridecyl alcohol.

7. A phosphate mixed ester as claimed in claim 1 wherein said hydroxy hydrocarbon is an oxyethylated mixture or primary alkyl alcohols containing four to 12 carbon atoms.

* * * * *